Jan. 20, 1931.  C. P. HEGAN  1,789,931
AIR FILTER
Filed Oct. 15, 1926   2 Sheets-Sheet 1

Inventor
Chester P. Hegan
By his Attorneys
Emery, Booth, Janney & Varney

Jan. 20, 1931. C. P. HEGAN 1,789,931
AIR FILTER
Filed Oct. 15, 1926 2 Sheets-Sheet 2

Inventor
Chester P. Hegan
By his Attorneys
Emery, Booth, Janney & Varney

Patented Jan. 20, 1931

1,789,931

UNITED STATES PATENT OFFICE

CHESTER P. HEGAN, OF LOUISVILLE, KENTUCKY, ASSIGNOR TO AMERICAN AIR FILTER COMPANY, INC., OF LOUISVILLE, KENTUCKY, A CORPORATION OF DELAWARE

AIR FILTER

Application filed October 15, 1926. Serial No. 141,689.

This invention relates to air filters, and more particularly to air filters of the type in which impurities are removed from the air by impingement against surfaces which are coated with adhesive substances.

It is an object of the invention to provide a filter which shall automatically clean and recharge itself, and which shall thus be capable of efficient service over extended periods of time without attention from an operator.

Other objects and advantages of the invention will appear hereinafter.

A preferred embodiment of the invention selected for purposes of illustration is shown in the accompanying drawings, in which, Figure 1 is a top plan view of the apparatus.

Figure 1:
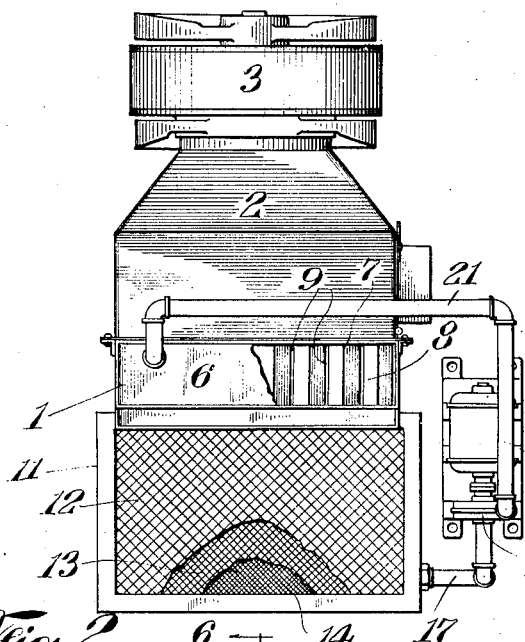
Figure 3:
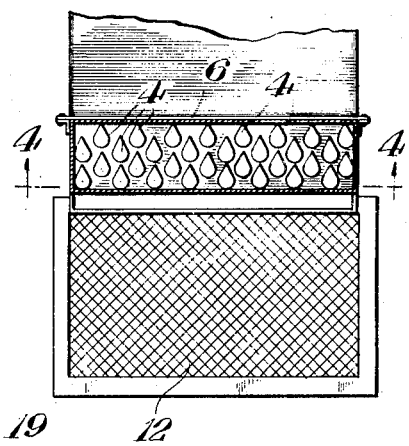
Figure 3 is a section on the line 3—3 of Figure 6, showing the stream line filter elements.
Figure 2:
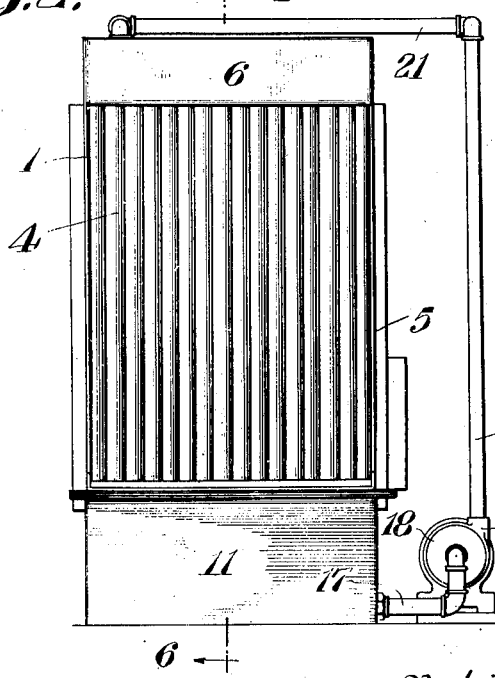
Figure 2 is a front elevation.
Figure 4:
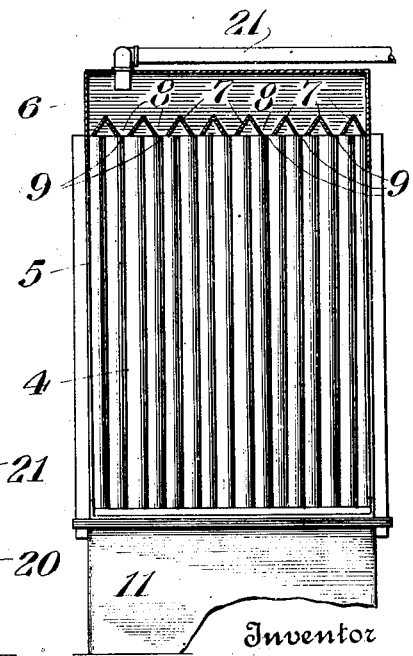
Figure 4 is a section on the line 4—4 of Figure 3.
Figure 5:
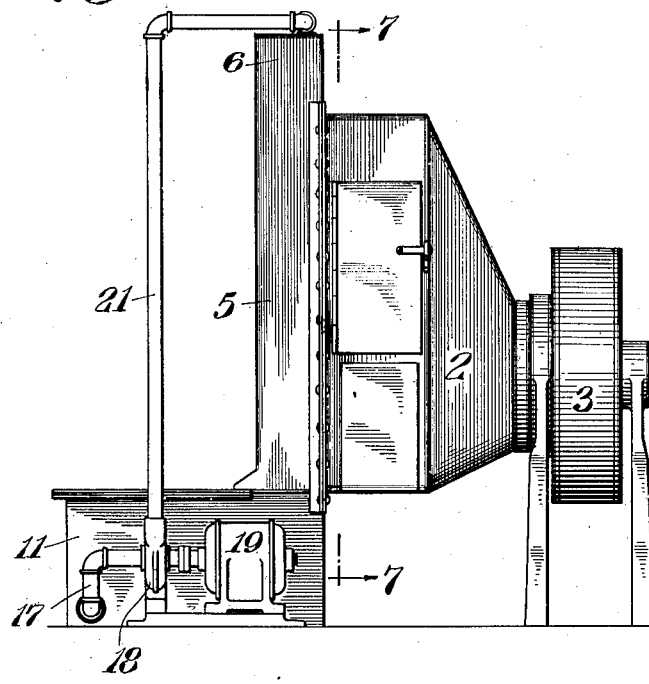
Figure 5 is a side elevation.
Figure 7:
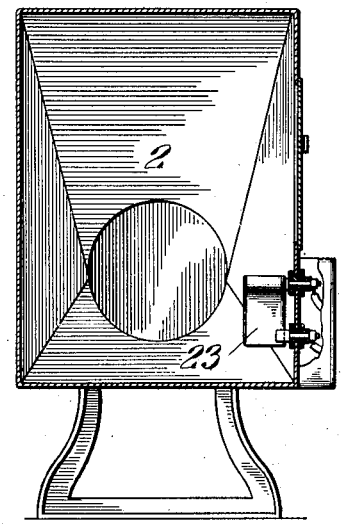
Figure 7 is a section on the line 7—7 of Figure 5.
Figure 6:
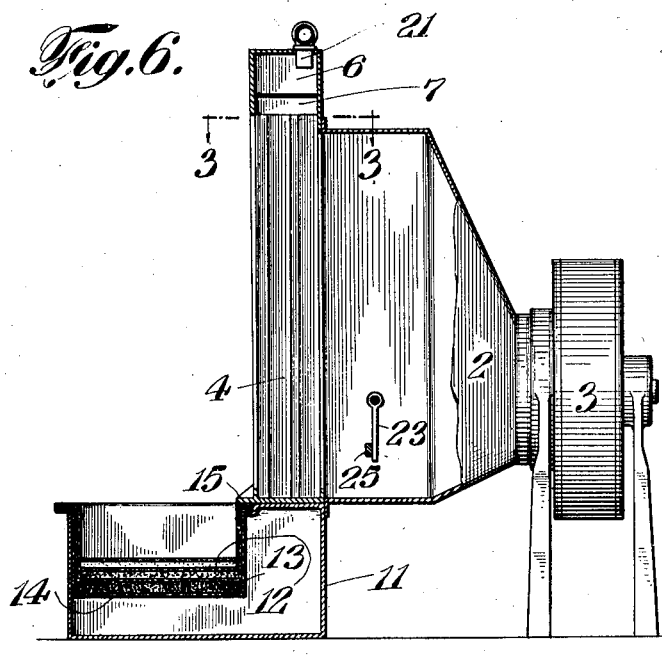
Figure 6 is a section on the line 6—6 of Figure 2.
Figure 8:
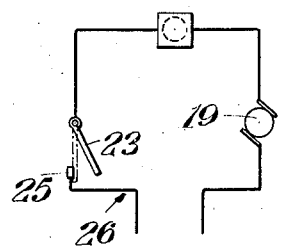
Figure 8 is a diagram showing a suitable electric circuit.

Referring to the drawings, the invention is illustrated as applied to an air filter comprising a filter cell 1 through which the air to be cleaned is drawn by means of the blower 3, a hood or casing 2 being provided to connect the two and to form a windway therebetween. The filter cell 1 may contain any of the various filtering media which are in common commercial use which depend for the removal of impurities from the air upon the use of an adhesive fluid coating, the filtering media merely serving to provide surfaces against which the dust particles or other impurities may impinge. In the preferred embodiment illustrated a series of vertically extending filter elements 4 of stream line cross section have been employed as the filtering medium, for it has been found that elements of this type offer somewhat less resistance to air flow than other elements which might be used instead. The filter elements are mounted in a sheet metal casing 5, open at the front and rear but closed on the top and bottom and both sides. The filter cell thus formed is secured to the hood 2 in any suitable manner as by bolts, but as will be observed, may be removed as a unit for repair or replacement.

Immediately above the filter elements 4 and contained within the same sheet metal casing is a reservoir 6 which is separated from the upper portion of the cell by a series of horizontally extending V-shaped members 7 forming the troughs 8 therebetween. At the bottom of each trough is formed a slit 9 for purposes hereinafter set forth.

Beneath the filter cell 1, and preferably arranged in a manner to partially support the same, is a reservoir 11 having contained therein a series of baskets 12, 13 and 14, which baskets contain layers of graduated filtering material, the basket 12 containing relatively coarse material, the basket 13 containing material which is somewhat finer, and the basket 14 containing relatively fine material. The lower portion of the filter cell 1 is provided with a lip 15 extending over the edge of the baskets in such manner that liquid flowing from the filter cell will be deposited in the baskets.

Connected to the lower part of the reservoir 11 is a pipe 17 which is connected to the intake opening of the pump 18 which is driven by the electric motor 19. The outlet opening 20 of pump 18 is connected by means of pipe 21 with the top of the reservoir 6.

As has been previously set forth, in filter cells of the type disclosed herein, the surfaces of the filter elements are intended to be coated with an adhesive fluid which causes dust particles and other impurities which impinge against the surfaces of the filter elements to stick, whereby they are removed from the discharged air. After running a certain length of time, depending upon the amount of dirt in the air, the filter elements become coated with dust and other impurities, and in order to maintain the efficiency of the filter it becomes desirable to remove the accumulated dust and to apply a fresh coating of adhesive liquid. It has been found that by flushing the filter elements with a large quantity of the adhesive fluid, the accumulated dust is easily removed and at the same time the desired recharging or recoating of the filter elements is accomplished. Accordingly, it is proposed to provide a pool of the adhesive liquid in the reservoir 11 which liquid may be pumped by the pump 18 through the pipes 17 and 21 to the distributor reservoir 6 from which it is permitted to flow by gravity through the slits 9 over the surfaces of the filter elements whereby the same are cleaned and recoated. As the flushing operation progresses, the mass of oil and accumulated dirt flows down the filter cell and over the lip 15 into the baskets 12, 13 and 14, the filtering material contained therein serving to separate the dust and dirt from the oil and permitting the clean oil to drip to the reservoir 11.

It has been found undesirable in some cases, however, to permit the flushing operation to take place while the filter is in operation, and accordingly in the present apparatus means have been provided by which the filter may be automatically cleaned and recharged by flushing with adhesive liquid whenever the operation of the filter is stopped.

For this purpose a vane 23 has been pivotally mounted in the hood 2, in such manner that whenever the filter is in operation the vane will assume a substantially horizontal position, while when the filter is out of operation, the vane will assume a substantially vertical position. In the embodiment illustrated the vane 23 is permitted to act as a switch forming part of an electric circuit for controlling the operation of the electric motor 19. Thus, when the vane 23 assumes a vertical position, as when the filter is out of operation, it makes the contact 25 which closes the circuit 26 to start the motor 19. As it is not desirable in some cases that the flushing operation be continued during the entire time that the filter is shut down, automatic means may be provided which break the circuit after a predetermined interval of time, thus permitting the motor 19 to stop. Such automatic mechanisms are of standard construction and inasmuch as they form no part of the present invention will not be described in detail herein. As will be understood, when the filter is again put into operation the automatic mechanism may be reset in order that when the operation of the filter is again stopped, the flushing operation may be carried on and stopped automatically.

It will be understood that the invention may be variously modified and embodied within the scope of the subjoined claims.

I claim as my invention:

1. In an air filter, in combination, a filter cell, means to cause a current of air to flow through said cell, means to flush said cell, and means to cause said last named means to be operated automatically upon cessation of operation of said first named means.

2. In an air filter, in combination, a filter cell, means to cause a current of air to flow through said cell, and automatic means to flush said cell upon cessation of operation of said first named means.

3. In an air filter, in combination, a filter cell coated with viscous liquid, means to cause a current of air to flow through said cell, means to flush and recoat said cell with viscous liquid, and means to cause said last named means to be operated automatically upon cessation of operation of said first named means.

4. In an air filter, in combination, a filter cell, means to cause a current of air to flow through said cell, a reservoir disposed to receive liquid flowing from said cell, means to pump liquid from said reservoir to the top of said cell, means to distribute the liquid over the filtering media contained in said cell, and means controlled by said first named means to start said pumping means when said first named means is stopped.

5. In an air filter, in combination, a filter cell, means to cause a current of air to flow through said cell, a reservoir disposed to receive liquid flowing from said cell, means to pump liquid from said reservoir to the top of said cell, means to distribute the liquid over the filtering media contained in said cell; and automatic means to cause said pumping means to be operated upon cessation of operation of said first-named means.

6. In an air filter, in combination, a filter cell, means to cause a current of air to flow through said cell, a reservoir disposed to receive liquid flowing from said cell, means to pump liquid from said reservoir to the top of said cell, means to distribute the liquid over the filtering media contained in said cell, a vane pivotally disposed in said current of air, and automatic means controlled by said vane to control the operation of said pump.

7. A filter of the deflector type, comprising deflector elements, means for causing a current of air to flow past said deflector elements, a reservoir for a supply of viscous liquid, means for flushing the outer surface of said deflector elements with said viscous liquid to remove accumulated impurities and to provide an adhesive coating thereon, including a pump connected to said reservoir, means for separating said impurities from the liquid and returning said purified liquid to said reservoir, and means to cause said pump to be operated upon cessation of operation of said first-named means.

8. In an air filter, means for providing viscous coated surfaces against which solid particles entrained in the air stream may impinge, means for causing air to flow through said filter and past said surfaces, means for flushing down said surfaces to remove accumulations of solid particles, and means interposed in the air stream and operative only after cessation of flow of air through said filter, to cause actuation of said flushing means.

9. In an air filter, a filter cell having a filtering medium therein, means to cause a current of air to flow through said cell and means interposed in said air current and operative during a period of cessation of air flow to cause an unimpeded flow of viscous liquid to be applied to air current encountering portions of said medium, to remove accumulations of solid particles from and to provide a fresh viscous coating on said medium.

10. In an air filter, the combination of a filter cell, means for inducing a current of air therethrough, and means interposed in said air current to cause flushing said cell only during arrested operation of said air current inducing means.

In testimony whereof, I have signed my name to this specification this eleventh day of October, 1926.

CHESTER P. HEGAN.